(12) United States Patent
Ghourchian et al.

(10) Patent No.: US 11,212,650 B2
(45) Date of Patent: *Dec. 28, 2021

(54) DEVICE-FREE LOCALIZATION METHODS WITHIN SMART INDOOR ENVIRONMENTS

(71) Applicant: AERIAL TECHNOLOGIES, Montreal (CA)

(72) Inventors: Negar Ghourchian, Montreal (CA); Michel Allegue Martinez, Montreal (CA); Doina Precup, Cote Saint-Luc (CA)

(73) Assignee: Aerial Technologies, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,759

(22) Filed: Sep. 14, 2020

(65) Prior Publication Data

US 2020/0413226 A1 Dec. 31, 2020

Related U.S. Application Data

(63) Continuation of application No. 16/461,492, filed as application No. PCT/CA2017/000247 on Nov. 21, 2017, now Pat. No. 10,779,127.

(60) Provisional application No. 62/425,267, filed on Nov. 22, 2016.

(51) Int. Cl.
*H04W 24/00* (2009.01)
*H04W 4/029* (2018.01)
*H04W 4/33* (2018.01)

(52) U.S. Cl.
CPC ............ *H04W 4/029* (2018.02); *H04W 4/33* (2018.02)

(58) Field of Classification Search
CPC ....... H04W 64/00; H04W 4/02; H04W 4/029; H04W 4/33
USPC ......................................... 455/456.1
See application file for complete search history.

(56) References Cited

U.S. PATENT DOCUMENTS

2010/0109842 A1* 5/2010 Patel .................... G01C 21/206
340/10.1
2018/0365975 A1* 12/2018 Xu ........................... G01V 3/12

* cited by examiner

*Primary Examiner* — Temica M Beamer
(74) *Attorney, Agent, or Firm* — Rosenberg, Klein & Lee

(57) ABSTRACT

Device-free localization for smart indoor environments within an indoor area covered by wireless networks is detected using active off-the-shelf-devices would be beneficial in a wide range of applications. By exploiting existing wireless communication signals and machine learning techniques in order to automatically detect entrance into the area, and track the location of a moving subject within the sensing area a low cost robust long-term tracking system can be established. A machine learning component is established to minimize the need for user annotation and overcome temporal instabilities via a semi-supervised framework. After establishing a robust base learner mapping wireless signals to different physical locations from a small amount of labeled data; during its lifetime, the learner automatically re-trains when the uncertainty level rises significantly. Additionally, an automatic change-point detection process is employed setting a query for updating the outdated model and the decision boundaries.

15 Claims, 7 Drawing Sheets

| Dataset | Initial Test | Diagn. 1 | Diagn. 2 | Diagn. 3 | Adaptive Learner |
|---|---|---|---|---|---|
| Apartment 1 | 98% | 87% | 84% | 74% | 94% |
| Apartment 2 | 94% | 86% | 80% | 77% | 91% |
| Apartment 3 | 95% | 85% | 85% | 84% | 92% |
| Apartment 4 | 96% | 87% | 85% | 79% | 91% |
| Apartment 5 | 97% | 92% | 84% | 82% | 93% |
| Apartment 6 | 94% | 90% | 89% | 82% | 93% |
| Apartment 7 | 95% | 92% | 81% | 78% | 90% |

Figure 7

DEVICE-FREE LOCALIZATION METHODS WITHIN SMART INDOOR ENVIRONMENTS

CROSS-REFERENCE TO RELATED APPLICATIONS

This application claims the benefit of priority as a continuation of U.S. patent application Ser. No. 16/461,492 filed May 16, 2019 entitled "Device-Free Localization Methods within Smart Indoor Environments" which itself claims priority as a 371 National Phase Application of PCT/CA2017/000,247 filed Nov. 21, 2017 entitled "Device-Free Localization Methods within Smart Indoor Environments" which itself claims priority from U.S. Provisional Patent Application 62/425,267 filed Nov. 22, 2016 entitled "Device-Free Localization Methods within Smart Indoor Environments", the contents of both being incorporated herein by reference.

FIELD OF THE INVENTION

This invention relates to localization and more particularly to systems, methods, and data processing apparatus for long-term and robust device-free localization in smart indoor spaces.

BACKGROUND OF THE INVENTION

Positioning or indoor localization is an essential function of a smart environment, which enables discovering valuable knowledge about the performances, behaviour and preferences of residents, especially those who need long-term monitoring or care. Moreover, location-based applications that utilize such information can offer customizable services according to the dynamics of their users' surroundings. Surveillance and security, health and sleep monitoring, assisted living for elderly people or patients with disabilities and entertainment are a few examples of applications wherein indoor location-aware computing has significantly improved performance.

Generally, there are two different categories of indoor localization systems based on how their sensing infrastructure interacts with the target: device-based and device-free. Most approaches within the prior art exploit device-based systems, where the location of a moving target or human body within the space is determined and represented by a device associated with the moving target or human user such as a Wireless enabled smart phone or a radio-frequency identification (RFID) tag.

These technologies are usually accurate and reliable, but most of them suffer from practical issues such as privacy concerns, physical contact with sensors, high implementation and maintenance cost, and cooperation from the subjects. Conversely, device-free passive (DFP) approaches do not require users to carry any devices or actively participate in the positioning process. Most of the DFP localization systems adopt a radio frequency (RF) sensing infrastructure (such as RFID, microwave, FM signals, etc.) and rely on the influence of the human body's presence and movement to influence these signals, e.g. through reflection.

A few existing systems have employed information gleaned from Wireless signals such as channel state information (CSI) and received signal strength indicator (RSSI) to perform active or passive localization indoors. These systems are mainly enabled by recent wireless technology improvements and the fact that wireless signals are pervasive at most of indoor spaces such as residential, industrial, and public places. The basic idea amongst such systems is to take advantage of these wireless signals to monitor and quantify the distortions arising in the strength and patterns of signals between two nodes of communication (transmitter and receiver) and characterize the environment including human movements and their locations. See, for example, Xiao et al. in "Passive Device-Free Indoor Localization using Channel State Information" (Proc. IEEE $33^{rd}$ Int. Conf. Distributed Computing Systems (ICDCS), pp. 236-245, 2013) wherein a CSI-based localization system utilizes multiple pairs of transmitter-receiver devices to estimate the location of a moving entity within a sensing area.

Despite some preliminary success, most of these device-free passive systems have been implemented and evaluated using several devices in controlled sensing environments, such as a university laboratory or a classroom, with a large volume of human annotated data and within predefined and short-term scenarios.

On the other hand, wireless signal components are sensitive to many internal and external factors including but not limited to multi-path interference, building attenuation, device and/or antenna orientation issues, changes in the environment (such as changing the position of objects) and signal interference. Therefore, performance of such localization systems usually degrades under realistic conditions and/or over time.

Accordingly, it would be beneficial to provide a system that offers a robust and passive solution for inferring the location of a moving target within an indoor sensing area, which can be created by (at least) a pair of off-the-shelf wireless devices. Furthermore, it would be beneficial for the system to exploit a semi-supervised learning framework employing multiple machine learning techniques in order for the system to maintain long-term accuracy and performances.

SUMMARY OF THE INVENTION

It is an object of the present invention to mitigate limitations within the prior art relating to localization and more particularly to systems, methods, and data processing apparatus for long-term and robust device-free localization in smart indoor spaces.

In accordance with an embodiment of the invention there is provided a system for moving target localization within indoor environments covered by existing wireless communication infrastructure, wherein the system divides the localization problem into two phases comprising an initial offline training phase using a batch of labeled training data, (i.e. wireless signals and their corresponding location labels) and an online evaluation and adaptation phase using the unlabeled streaming data (i.e. wireless signals without their any associated location labels).

In accordance with an embodiment of the invention there is provided a method for establishing an initial offline location recognition phase that includes receiving and analyzing wireless signals and their corresponding labels, while a user is present within different location spots of a sensing environment. The method comprising various signal processing, data mining and feature extraction techniques to statistically formulate the correlation between wireless signal readings and the location of the movements and events inside the sensing area. The method also includes building a probabilistic localization model using a base classifier, which utilizes computed statistics from wireless signals to generate respective decision boundaries and a confidence score that quantifies how certain the classifier is of its decision.

In accordance with an embodiment of the invention there is provided a method for real-time localization phase comprising receiving a live stream of unlabeled wireless signals without any associated location indication and estimating a location label for each segment of wireless signals using a probabilistic model built in an initial offline training phase. The method also includes a decision-making module that applies several strategies, for reducing the variance in the sequence of predicted labels and hence improving the stability of the localization system. The method also includes outputting final location labels to another system and/or process.

In accordance with an embodiment of the invention there is provided a method for automatically detecting any structural shift and/or drift in the distribution of the streaming data comprising receiving a live stream of unlabeled wireless signals, applying a change-point-detection technique by continuously computing a divergence score, identifying the significant changes having a score above a predefined threshold. The method also includes outputting indicator of drift to another system and/or process.

In accordance with an embodiment of the invention there is provided a method for adapting the decision boundaries of a base classifier after occurrence of a shift/drift in wireless signal data stream is determined comprising receiving a stream of confidence scores and predicted labels from the real-time localization process and receiving at least one drift indicator. The method triggers an active query system that includes receiving the indicator, creating a repository of high-confidence samples of the wireless signals and their corresponding predicated labels and updating the training data of the base classifier according to the new changes.

BRIEF DESCRIPTION OF THE DRAWINGS

Embodiments of the present invention will now be described, by way of example only, with reference to the attached Figures, wherein:

FIG. 7 depicts an exemplary performance evaluation of accuracy of the room-level location identification concept according to an embodiment of the invention at different time intervals with and without adaptive solution.

DETAILED DESCRIPTION

Figure 1:
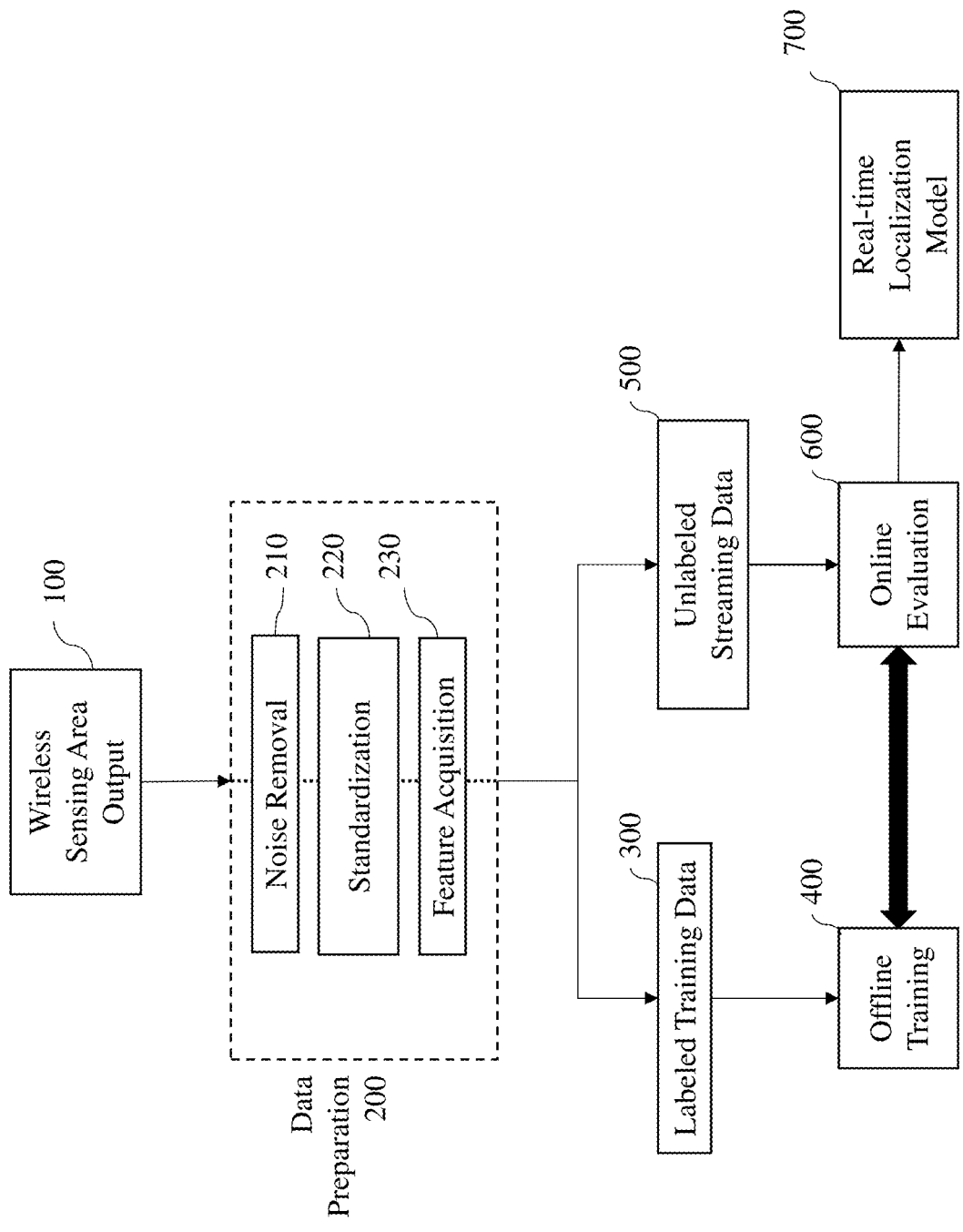
FIG. 1 depicts an exemplary system overview of an intelligent localization system according to an embodiment of the invention.

The present invention is directed to localization and more particularly to systems, methods, and data processing apparatus for long-term and robust device-free localization in smart indoor spaces.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "personal electronic device" (PED) as used herein and throughout this disclosure, refers to a wireless device used for communications and/or information transfer that requires a battery or other independent form of energy for power. This includes devices such as, but not limited to, a cellular telephone, smartphone, personal digital assistant (PDA), portable computer, pager, portable multimedia player, remote control, portable gaming console, laptop computer, tablet computer, and an electronic reader.

A "fixed electronic device" (FED) as used herein and throughout this disclosure, refers to a device that requires interfacing to a wired form of energy for power. However, the device can access one or more networks using wired and/or wireless interfaces. This includes, but is not limited to, a television, computer, laptop computer, gaming console, kiosk, terminal, and interactive display.

The term "wireless" as used herein and throughout this disclosure, refers to wireless communication which transfers information or power between two or more points that are not connected by an electrical conductor. The most common wireless technologies use radio waves to carry information by systematically modulating some property of electromagnetic energy waves transmitted through space, such as their amplitude, frequency, phase, or pulse width. Within this specification the term is employed with respect to systems, networks, devices, protocols etc. which may operate according to one or more standards including, but not limited to, international standards, national standards, standards established and maintained by an alliance of enterprises, and a standard established by an enterprise or small group of individuals. Whilst the embodiments of the invention are primarily described with respect to wireless infrastructure exploiting Orthogonal Frequency Division Multiplexing (OFDM) and accordingly infrastructure which may include that exploiting, but not limited to, wireless LAN (WLAN) such as IEEE 802.11a, IEEE 802.11g, IEEE 802.11n, IEEE802.11ac, HiperLAN/2 etc.; digital radio systems such as DAB, DAB+, etc.; digital television systems such as DVB-T, DVB-H, etc.; OFDM multiple access (OFDM-MA) such as IEEE 802.16e, IEEE 802.20, 3GPP long term evolution (LTE) etc.

The system described below in respect of FIGS. 1 to 7 is an intelligent indoor localization framework in the broader context of smart indoor spaces. This design methodology is motivated by low cost wireless technology that allows capturing and monitoring of the influence of human movements and/or any moving target (e.g., pet, robot) on the wireless signal propagation within indoor spaces covered by wireless networks. Owing to these recent improvements, the collected measurements from a range of existing off-the-shelf wireless devices such as laptop computers, smart TVs, wireless routers, and wireless access points, have great potential to reveal detailed information about the source(s) of the movements in the active sensing environment without requiring the installation and management of substantial dedicated hardware. Accordingly, embodiments of the invention address long-term indoor localization within residential, commercial, retail, and other environments either without any dedicated excessive device requirements or through the deployment of wireless infrastructure that does not require significant labour, expense, modification of the property.

In modern wireless communications, a wireless signal, including but not limited to channel state information (CSI), propagates between a transmitter and receiver through multiple transmission channels using Orthogonal Frequency Division Multiplexing (OFDM). This means that within each channel, the transmitter broadcasts simultaneously on several narrowly separated sub-carriers at different frequencies in order to increase the data rate. One example of the wireless measurements regarding channel properties which can form the basis of embodiments of the invention are the Channel State Information (CSI) values which can be obtained at the receiver. These describe how the transmitted signal is propagated through the channel and reveal channel variations and signal distortions experienced during propagation caused, for example, by scattering, fading and power decay with distance. The quantitative analysis of this signal propagation behavior within a wireless-covered area can identify and measure different types of disturbances, including those relating to human motion and the location of the movement.

The real-time framework according to embodiments of the invention is intended to discover the location of a human target within a sensing area at the sub-region level, by continuously collecting wireless signals and applying several analytic and modeling procedures to the collected measurements in order to infer correlation between obtained measurements and the location of the movements. A sub-region within a sensing area is defined as any smaller division or subdivision of a larger indoor area, which may (or may not) also align with the room boundaries within the property, such as kitchen, bedroom, living room and dining room within a residential property.

There are two major technical challenges that need to be addressed in order to design a robust wireless-based localization system. First, finding mathematical characterization of the disturbance and changes in wireless signals, originated from human body movements, is a challenging problem due to the complexity of the wireless signal propagation in indoor environments. Therefore, the first challenge of designing an intelligent indoor localization system is to characterize statistically the correlation between the location of motions and the signals.

Moreover, in practice, many undesired environmental and/or internal conditions can cause temporal instability and high variance in wireless signals, which may result in shift or drift in the localization model learned from these measurements. The unwanted changes degrade the performance and accuracy of the localization system over time by strongly affecting the correlation between input measurements and the inferred locations.

A general exemplary system overview of the proposed intelligent localization system according to an embodiment of the invention is depicted in FIG. 1. The proposed system offers robust long-term localization by operating in two phases. Within the first phase, an Offline Training procedure 400 exploits a small set of wireless data associated with corresponding sub-region labels, Labelled Training Data 300, to build an initial base classifier for location identification. In the second phase, an Online Evaluation phase 600, the location of a moving object within the sensing area is calculated from Unlabeled Streaming Data 500 and using the base localization model. The Online Evaluation phase 600 also includes an automatic procedure to detect fundamental changes in the signal structures, and an adaptive decision-making module including strategies and solutions to cope with the noisy and non-stationary nature of wireless signals.

Additionally, the wireless measurements collected from an active sensing area are initially processed in a Data Preparation module 200, where multiple steps of pre-processing and data mining procedures are carried out, in order to eliminate or reduce redundant and noisy samples and prepare a stable feature vector before providing it to the localization system. The data preparation module includes, but is not limited to, Noise Removal 210, Standardization/

Data Preparation 220, and Feature Acquisition 230 units. The Data Preparation module 200 exploits the data acquired/generated within Wireless Sensing Area Output 100 which are acquired by the wireless devices within the sensing area such as portable electronic devices (PEDs) and/or fixed electronic devices (FEDs). An infrastructure exploiting FEDs is subject to less frequent adjustment/change by addition and/or removal of another FED whereas PEDs may be more variable in their presence and/or location.

Having outlined in FIG. 1 the main blocks and their role in the system according to an embodiment of the invention further details regarding each specific module are described and discussed below in respect of some implementation examples.

Figure 2:
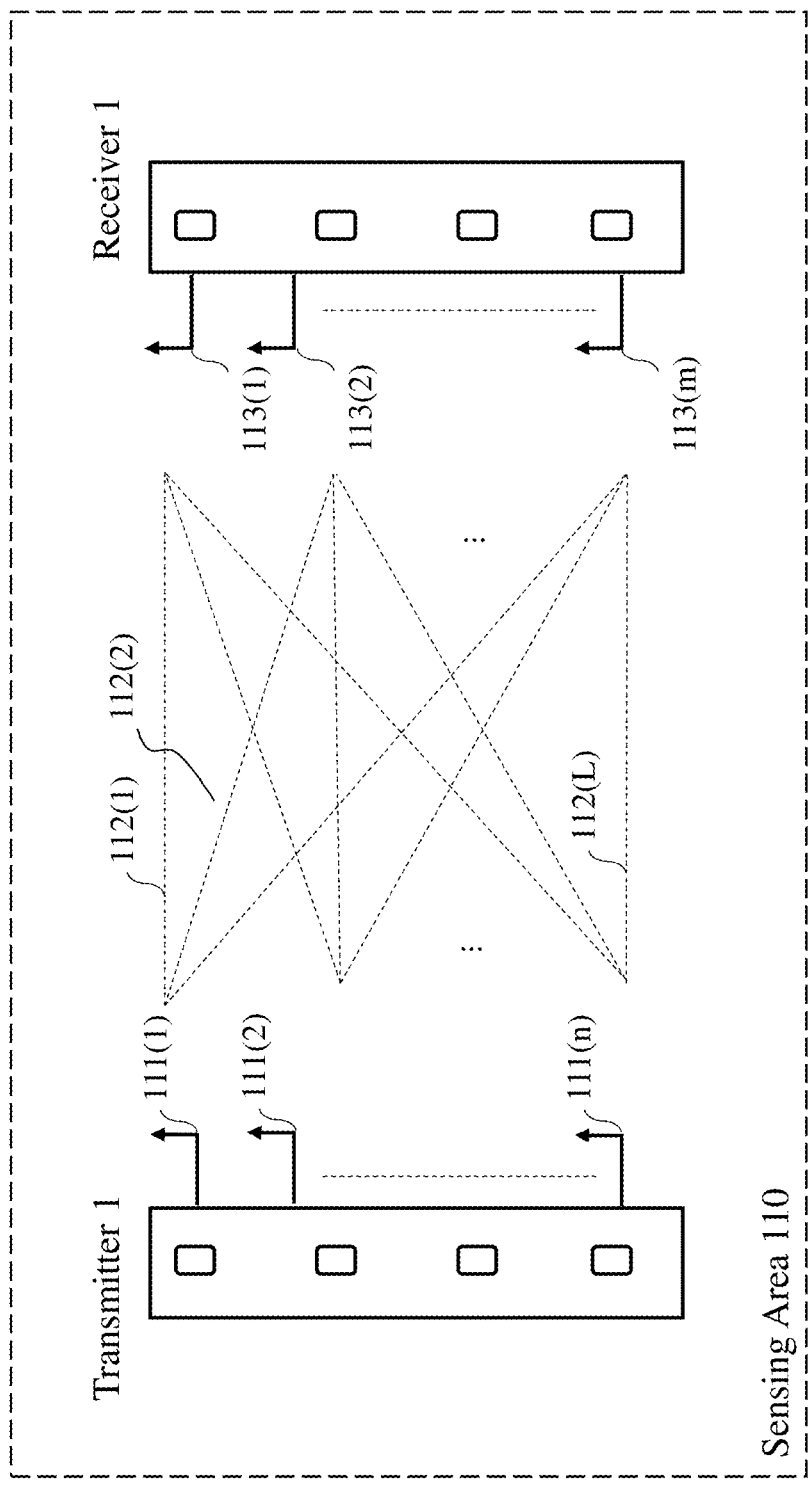
FIG. 2 depicts an exemplary schematic representation of signal propagation between transmitter and receiver antennas within a sensing area according to an embodiment of the invention.

Referring to FIG. 2 there is depicted a Sensing Area 110 created by an n×m multiple input and multiple output (MIMO) system with n transmitting antennae and m receiving antennae. Accordingly, FIG. 2 depicts a schematic representation of signal propagation between a pair of wireless devices. Let $\ell \in \{1, \ldots, L\}$ denote the antenna links between Transmitter 1 and Receiver 1, where L=n×m, and $CSI_{i\ell}(t)$ denote a complex number describing the signal received at subcarrier $i \in \{1, \ldots, I\}$ at time t, which is defined by Equation (1).

$$CSI_{i\ell} = |CSI_{i\ell}| e^{j \sin \angle CSI_{i\ell}} \quad (1)$$

$|CSI_{i\ell}|$ and $\angle CSI_{i\ell}$ denote the amplitude response and the phase response of subcarrier i of link $\ell$, respectively. The total number of subcarriers I per link depends on the physical property of the hard-ware device used for collecting CSI values and is fixed for all links.

Figure 3:
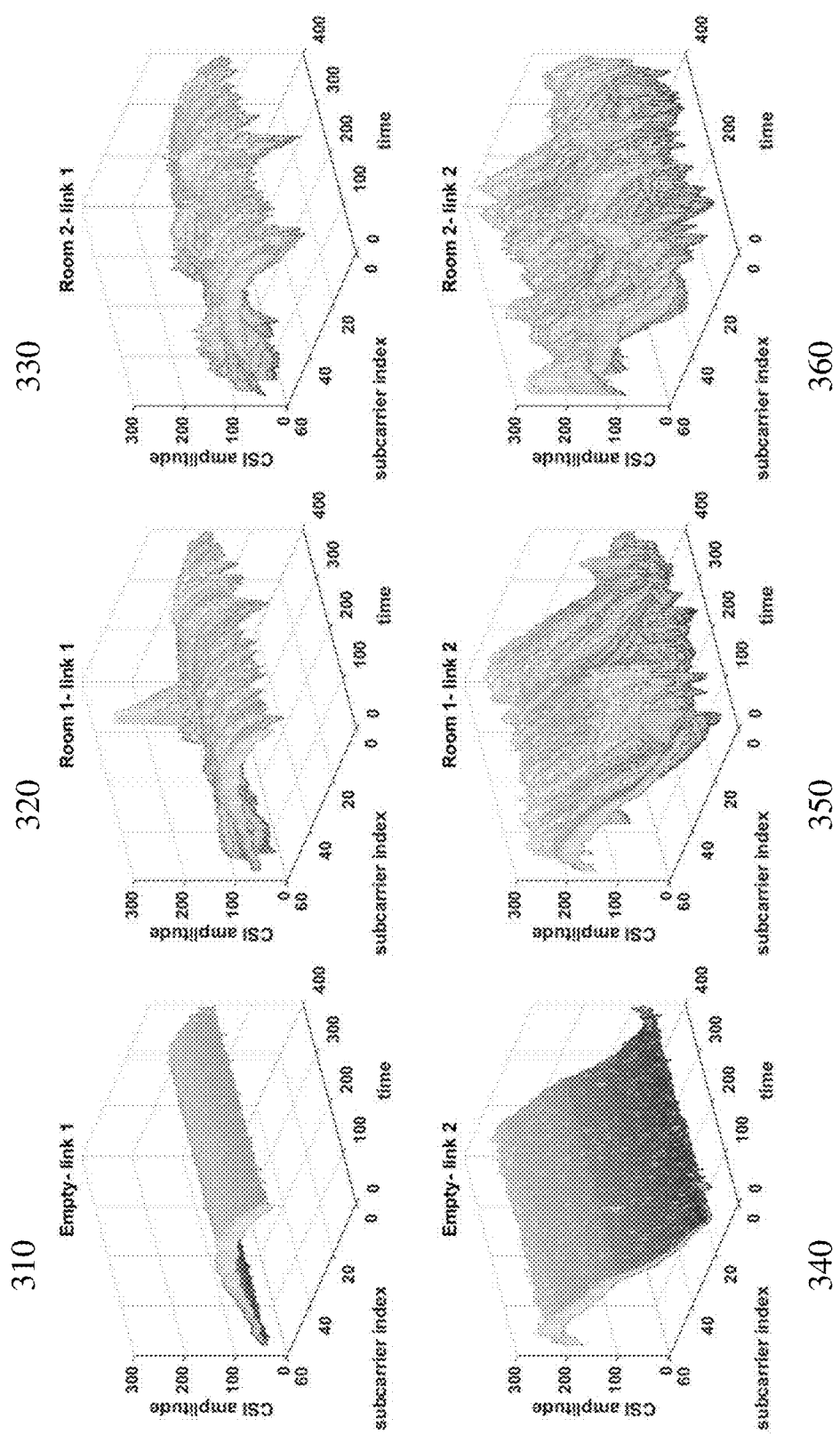
FIG. 3 depicts typical measurements of CSI signal magnitudes obtained whilst a user is walking insides two different sub-regions within a sensing area according to an embodiment of the invention.

Environmental changes and human body movements affect the CSI values of different links independently, but affect the different subcarriers of each link in a similar manner. FIG. 3 presents examples of CSI amplitude streams captured over 20 seconds from two different links, while a user is walking inside two different sub-regions, Room 1 and Room 2, of a residential apartment, as well as a capture from an empty sensing area with no motion. Accordingly, FIG. 3 depicts first CSI data 310 for empty sensing area with link 1; second CSI data 320 for room 1 with link 1 and user moving; third CSI data 330 for room 2 with link 1 and user moving; fourth CSI data 340 for empty sensing area with link 2; fifth CSI data 350 for room 1 with link 2 and user moving; and sixth CSI data 360 for room 2 with link 2 and user moving.

As mentioned supra, the collected CSI measurements are constantly transformed from the sensing device to a Data Preparation module 200, where multiple processing procedures are applied to the data streams to enhance the raw data for further analysis, and to extract and/or generate discriminative features that precisely reflect distinguishable properties of different sub-regions within the sensing area. As discussed supra Data Preparation module 200 comprises but is not limited to, a Noise Removal 210 unit, Standardization 220 unit and Feature Acquisition 230 units.

Noise Removal 210: The raw data contain high-frequency noise from a variety of internal and surrounding sources. Moreover, the mobility and other physical activities of human or any moving target within indoor spaces happen at different but predictable range of frequencies. Therefore, a set of digital filters targeting specific frequency bands collect information about different target moving activities, such as a human walking or pet movement, is considered as part of the methods described herein. As a working example, the frequency of typical human walking happens at low frequency, for example below 2 Hz, and accordingly a low-pass filter with cut-off frequency of 2 Hz can be applied to each CSI stream individually, in order to remove the high-frequency noise as well as the static components.

Standardization 220: At each time stamp t, multiple CSIs values for different Transmitter-Receiver links can take values in different dynamic ranges, while the values of different subcarriers within each link can get shifted and scaled over time. These irrelevant and unwanted variations can be removed by introducing a fixed-score scaling normalization module, for example, which standardizes the CSI feature space to a predefined reference range, such that meaningful and desired variations in the signals can be reliably tracked. The L2-norm of the CSI vector was calculated for each link to rescale all values to the reference range.

Feature Acquisition 230: Extracting relevant features from the input data helps to explore frequency diversity of CSI values with different amplitudes and phases over multiple subcarriers and their correlation to the events occurred in the covered area. The Feature Acquisition module 230 begins by sliding a moving window with overlap over the stream of samples, in order to extract correlated features that describe the location of environmental events. This creates a vector of the form given by Equation (2).

$$W(t) = \{CSI_{i\ell}(t-w+1), \ldots, CSI_{i\ell}(t-1), CSI_{i\ell}(t)\} \quad (2)$$

Here, w is the size of the moving window and t is the time stamp of the CSI values of subcarrier i of link $\ell$. As introduced supra, complex values $CSI_{i\ell}$ can be presented by their Amplitude Information 230A $|CSI_{i\ell}|$, and Phase Information 230B $\angle CSI_{i\ell}$. Subsequently, this data is used to extract/generate a new features space with the fusion of multiple domain information including, but not limited to, time-domain or Temporal Amplitude Information 231, Frequency Amplitude Information 232, and Phase Information 233.

Figure 4:
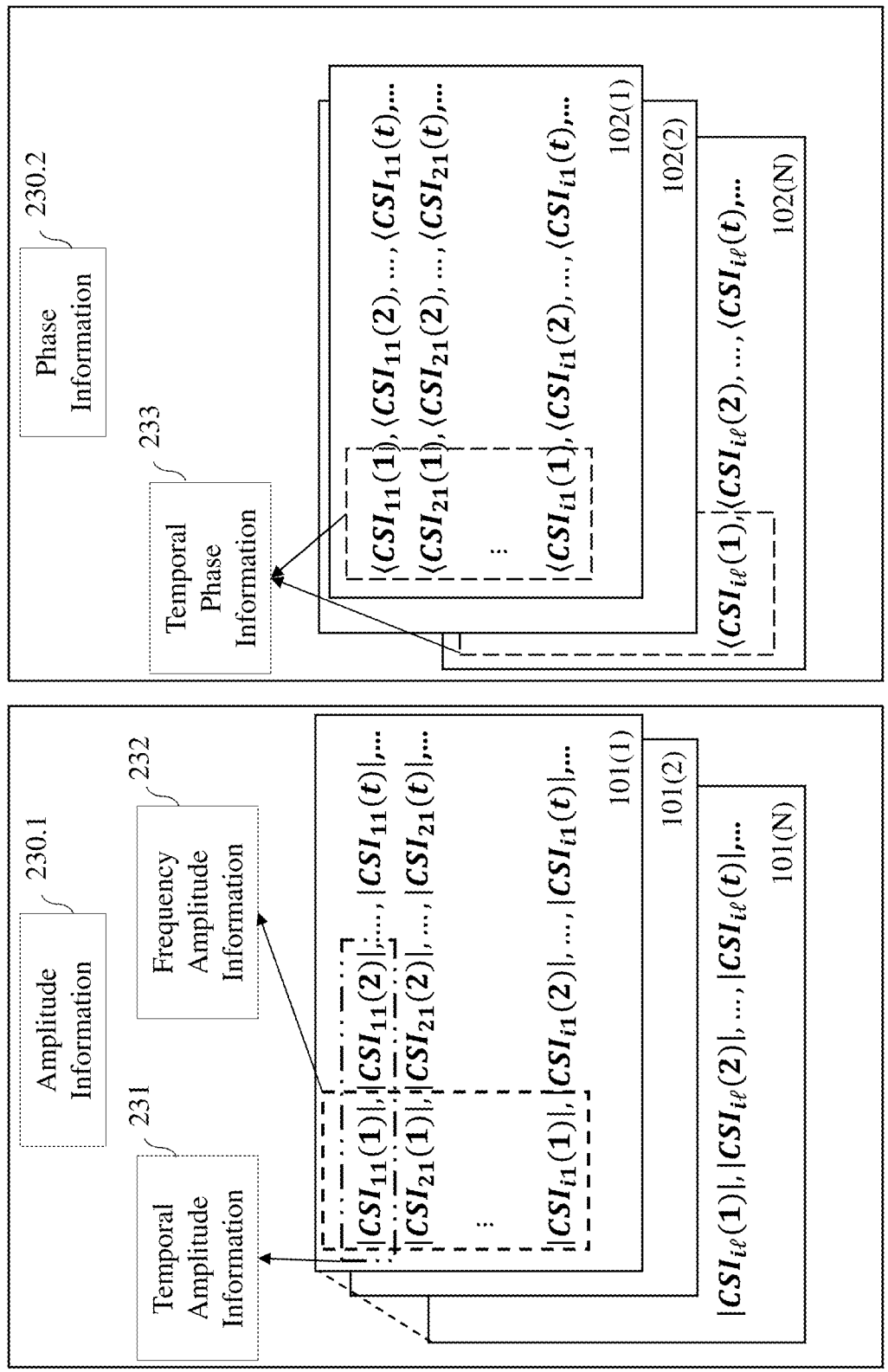
FIG. 4 depicts an exemplary architecture of a system for feature generation from the CSI measurements according to an embodiment of the invention.

Referring to FIG. 4, some exemplary strategies for Feature Acquisition 230 are illustrated. As a working example, the following statistic are calculated within an embodiment of the invention to correlate the CSI signal behavior to the location of movements in the Sensing Area 110.

Temporal Amplitude Information 231: Statistics computed over time from per-subcarrier CSI amplitudes, are the most widely used features in CSI-base systems, since they exhibit higher temporal stability. Within embodiments of the invention, the moving variance and moving average of all CSI amplitudes within each moving window $W_{i\ell}(t)$ are extracted, following the same feature extraction techniques introduced by the inventors in U.S. Provisional Patent 62/347,217 entitled "System and Methods for Smart Intrusion Detection using Wireless Signals and Artificial Intelligence" filed Jun. 8, 2016.

Frequency Amplitude Information 232: Various CSI amplitudes for different subcarriers of each Rx-Tx link describe channel properties in the frequency domain and a moving subject can change signal reflections differently based on their location. This results in different delay profiles, where the frequency information is embedded in the correlations among (CSI values of) subcarriers in each Rx-Tx link. Within an embodiment of the invention, the frequency information is inferred by computing statistics within each moving window $W_\ell(t)$ that include, but are not limited to, variance, log energy entropy, standard deviation, kurtosis, and skewness.

Temporal Phase Information 233: In wireless communication applications, the phase difference between the received signals at each antenna array is roughly correlated to the angle of arrival (AOA), which yields a method for determining the direction of RF wave propagation. Through exploratory experimentation, the inventors established that the phase differences between various pairs of Rx-Tx links can help localize human movement with respect to the positions of the transmitter and receiver devices. Therefore, within some embodiments of the invention, the variance of the phase differences between the subcarriers of all pairs of Rx-Tx is tracked over each moving window $W_{i\ell}$(t), as another group of relevant features for the proposed localization system.

Figure 5:
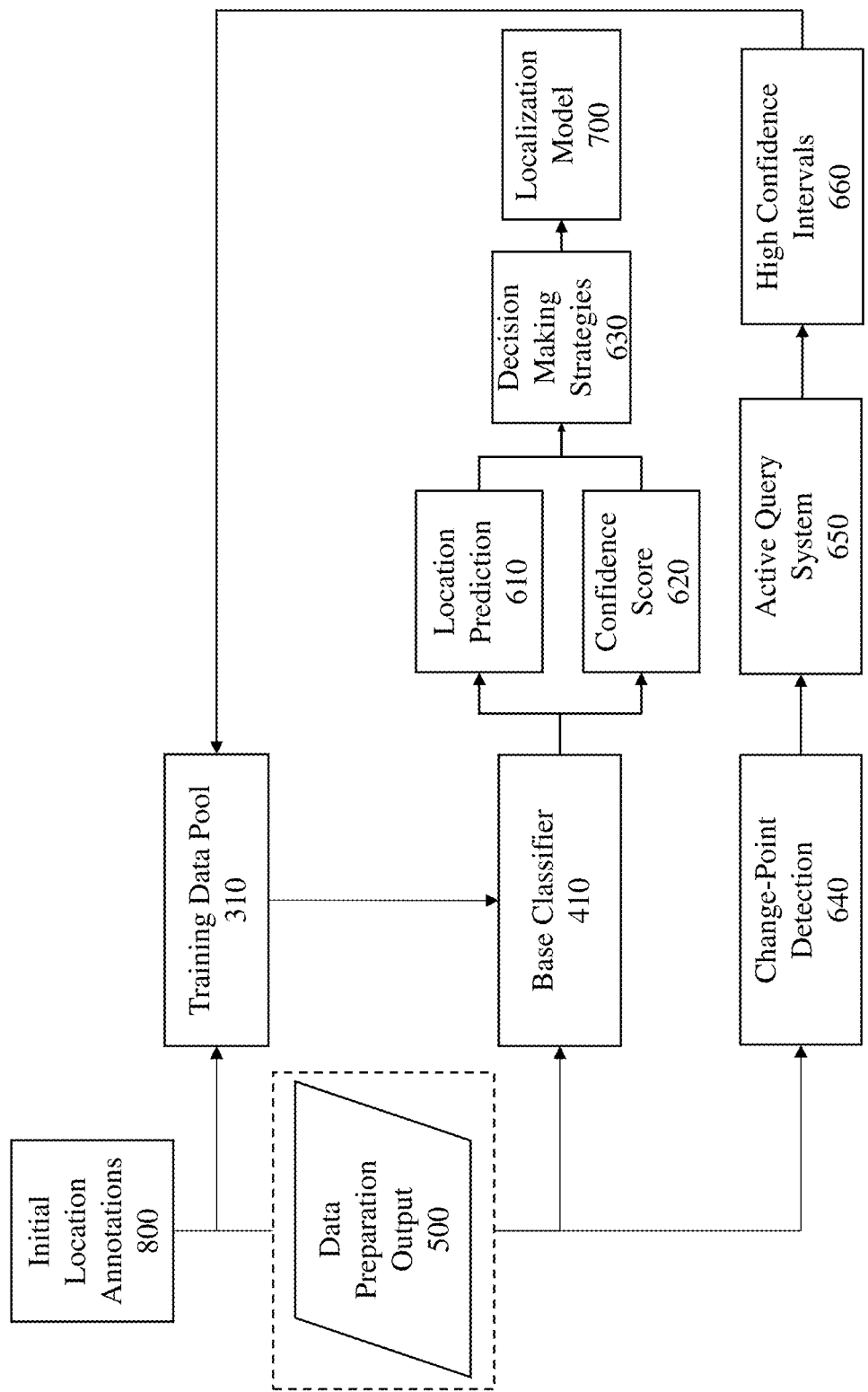
FIG. 5 depicts an exemplary architecture of the proposed methodology for adaptive localization framework according to an embodiment of the invention.

The Data Preparation module 200 is followed by the proposed localization system, where machine learning and decision-making techniques are used to infer the location of the moving target within the sensing area. An exemplary architecture of the proposed methodology for adaptive localization framework according to an embodiment of the invention is depicted in FIG. 5.

The localization process initiates by transforming a small amount of prepared CSI data from step 500, associated with corresponding sub-region labels from Initial Location Annotations 800 unit to form a Training Data Pool 310. The Offline Training process 400 begins by fitting a base supervised learner (Base classifier 410) to obtain a mapping between features extracted from CSIs and different sub-regions in the sensing environment, using the initial labeled data. In order to simplify the problem, localization is performed at the level of discrete "sub-regions" inside a dwelling, which could be rooms, but also finer grained than rooms ("on the couch" or "in the reading chair", for example).

An example of algorithm that can be used as the Base Classifier 410 for identifying the location of a walking subject is "Random Forests", see Breiman in "Random Forests" (Machine Learning, Vol. 45(1), pp. 5-32, 2001), although it would be evident that other classification techniques as known within the art may be applied. Random Forest is an ensemble estimator that builds several decision trees on random subsets of the samples from the original training set and then aggregates their individual predictions, usually by averaging, to form final decisions. Therefore, besides predicting a label, the obtained classifier also provides a measure of the uncertainty in its prediction, expressed through the proportion of votes given by all trees for each class. Thus, the proportion of votes that agree on the outcome can be used to estimate a probabilistic confidence score, which quantifies how certain the classifier is of its decision.

After building the base classifier, Online Evaluation 600 which runs real time on the streaming data begins. Arriving CSI measurements are processed in Data Preparation module 200 as described before, and the obtained features are then fed into the Base Classifier 410 frame by frame, which results into a stream of predicted sub-region labels (transferred to Location Prediction 610 unit), associated with their corresponding confidence scores (transferred to Confidence Score 620 unit).

From a practical point of view, it is important to have a stable localization system, which smoothly transits between different location classes when the user walk inside the sensing area from one sub-region to another. Thus, in order to reduce the variance in the sequence of predicted labels and minimize the error when outputting final decisions to the end user, some additional strategies may be required to increase the stability of the real-time localization. Decision Making Strategies module 630: The role of this module is to receive a buffer of labels from Location Prediction 610 and their associated from Confidence Score unit 620, and apply several strategies to output a stable location label to Localization Model unit 700.

Consider a K-Class classification problem, where for each time frame W(t) (from Equation (2)) a class label $c_t$ is independently obtained from the base learner with confidence scores (prediction probability) of $p_t$. Considering a decision frame $\hat{W} \geq W$ with length $\hat{w}$, where given a prediction history, $\{c_{t-\hat{w}+1}, \ldots, c_{t-1}, c_t\}$ and $\{p_{t-\hat{w}+1}, \ldots, p_{t-1}, p_t\}$, a final class decision $C_T$ is made for time buffer $T = \{t-\hat{w}+1, \ldots, t-1, t\}$ through several steps, including but not limited to:

Outlier Removal: discarding rare class labels that last less than α consecutive samples;

Uncertainty Removal: discarding any class label with confidence score less than β;

Transition Bias: imposing an extra bias towards keeping the current predicted class label until the average confidence score for switching to another class reaches a certain level γ.

The parameters of Decision Making Strategies 630 module (α, β and γ) can be empirically learnt from the data over time. At the end of the localization process, only the final decision $C_T$ is transferred to the Localization Model 700 unit, where the final predicted location label appears on the user interface.

Concept Drift Detection 640: As mention supra, drifts or unwanted changes in the distribution of input data are expected with long-term usage of the CSI-based localization system. Therefore, the Localization Model 700 learnt from the initial training data utilizing the user annotated data needs to be updated over the lifetime of the system. One possible solution is to ask the end-user to provide a new batch of labeled data and retrain the system when the performance of the system degrades. However, it is cumbersome to query the end-user too often or any time a drift happens, and the goal is to avoid involving the user for as long as possible.

In order to maintain the performance of the system in spite of the drift, the first step is to automatically detect significant changes in the distribution of features extracted from the CSI stream in a timely manner, and then update the outdated mode.

The gradual or abrupt drifts happens to the distribution of CSI magnitude (i.e., frequency information) over each Rx-Tx link independently, and can affect one, some or all of these links over time. Therefore, a change-point detection algorithm is required to constantly estimate and monitor the stability of all links individually. Referring to FIG. 5, a Change-Point Detection module 640 is employed, which uses Kullback-Leibler (KL) divergence as a distance metric to track substantial changes in the distribution of the features, $\{CSI_{1\ell}, \ldots, |CSI_{i\ell}|\}$, although it would be evident that other distance and/or divergence metrics as known within the art may be applied.

$$D_\ell(\delta) = \sum_{i=1}^{I} CSI_{i\ell}(t) \log \frac{CSI_{i\ell}(t)}{CSI_{i\ell}(t+\delta)}, \quad (3)$$

The KL-divergence between two distributions $CSI_{i\ell}$(t) and $CSI_{i\ell}$(t+δ) is estimated by Equation (3) where $D_\ell$ corresponds to the drift measure of link $\ell$, at time stamp δ after the initial training set captured at time t. An empirical threshold θ is set to automatically detect any significant divergence in any element of vector $D_\ell(\delta) = \{D_1, \ldots, D_L\}$.

Once a significant drift in any of the links is detected, the Change-Point Detection module 640 sends a drift indication to the Active Query System 650 which initiates an automatic update of the current Localization Model 700.

Adaptive Localization: Although the unwanted changes in CSI magnitude and their timing are not predictable, they usually happen over a short period of time and do not involve all signals simultaneously. Therefore, many samples still get correctly classified even after drift has occurred, as some partial mappings between the feature space and class labels still hold. The proposed methodology according to embodiments of the invention aims to use a selection of high quality representative samples from the history to update the Training Data Pool 310. In this manner the system exploits confidence scores provided by the Base Classifier 410 to establish high confidence intervals over the stream of unlabeled data and accumulate a batch of the most representative samples and their associated inferred labels over time. When the Change-Point Detection module 640 identifies a significant drift that triggers retraining, a query for updating the base classifier is formed. The Active Query system 650 receives these demands and pushes sub-samples from the most recent High Confidence Intervals 660 into a pool of labeled training data, Training Data Pool 310. In this way, there is no need to query the user to avoid deterioration in prediction accuracy and the system can maintain its performance even after drifts.

Let $X=\{X(1), X(2), \ldots, X(t), \ldots\}$ be the stream of features extracted from CSI values, and let $Y=\{Y(1), Y(2), \ldots, Y(t)\}$ be the true labels of $X(t)$: $t \in \{1, \ldots, t\}$. A sliding window P of length $\mu \gg w$ over the streaming unlabeled data starting from $t > t+1$, in which a history of prediction labels $\{c_{t-\mu+1}, \ldots, c_{t-1}, c_t\}$, and confidence scores $\{p_{t-\mu+1}, \ldots, p_{t-1}, p_t\}$, is kept.

The system narrows the collection of samples by setting a relatively high confidence threshold. Shortly after the Change-Point Detection module 640 produces an alert, the system queries the samples in high confidence intervals and updates the Base Classifier 410 with a fusion of the original training data and these new high-confidence samples. As the real-time platform needs to provide long-term functionality, the size of this repository of samples should be kept in check, in order to provide good scalability of data storage and retrieval. Thus, the system ensures that the size of the pool does not exceed a certain point.

Figure 6:
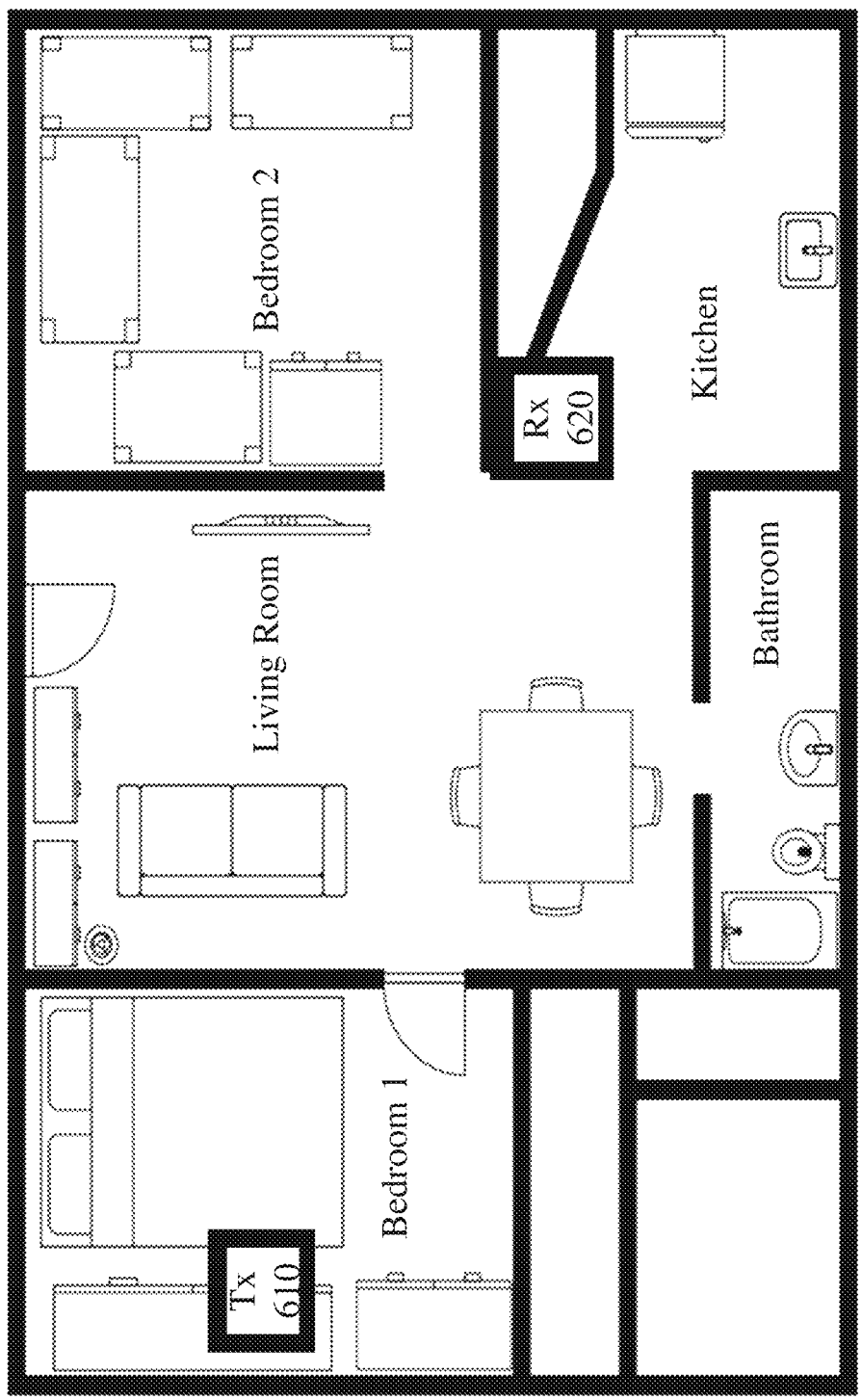
FIG. 6 depicts an example of device placement within a residential apartment.

Operation in Real Environments: The proposed localization platform can operate in indoor spaces such as residential, commercial, retail, and other environments, using a pair of off-the-shelf wireless devices. For example, a mini PC equipped with the CSI collection tool as receiver and a commercial access point as transmitter can be used to create a wireless connection for room-level localization. FIG. 6 depicts an example of device placement and floor plan in one residential apartment wherein a single Tx 610 and Rx 620 are depicted. After device placement, a short period of initial training is performed by asking the user to simply walk inside each room (or any other sub-regions within the space) and record the location labels. Also, a capture from the empty apartment is needed for the "No Motion" class. The user can interact with the system through a user interface, which can be accessed from any wireless enabled device such as a computer or a portable device such as tablet or smartphone. Once the initial training is over, the real-time localization system is activated, and the user is able to track the location of a moving person within the apartment. Beside location identification, this tool can be used as an intruder alarm that notifies the user as soon as a person enters in their empty apartment.

Performance Evaluation: The initial training of the localization system usually results in very robust performance, but it only lasts about a certain period before the accuracy begins to drop due to the unexpected signal changes. In contrast, the method described here detects significant changes and reacts in a timely fashion to maintain accuracy.

Experimental Set-Up: The proposed platform was deployed and evaluated in a number of residential apartments. For example, the table presented in FIG. 7 illustrates the accuracy of the real-time localization system right after the initial training, as well as in different time periods after the initial training, when conducted in 7 different residential apartments. In each round of experiments an initial training set was recorded, where the CSI values were captured while the user was asked to walk inside each room for 45 seconds. Also, a 45 second capture from the empty apartment was taken to train the empty or no motion class. The number of classes varied from 4 to 6 in different apartments, including the empty or no motion class. In order to obtain examples of drift in the input, a couple of diagnostic sets were captured in various time intervals from 60 minutes up to 11 hours after the initial set and these diagnostic sets were used to evaluate the adaptive algorithm. Referring to FIG. 7, 2 to 10 rounds of evaluation per apartment were performed in order to obtain averages for the performance results.

Experimental Results: The results presented FIG. 7 show that the accuracy obtained by the base learner is very high (as evaluated using a test set), but using the resulting classifier over an extensive period of time leads to significant accuracy loss. The proposed semi-supervised learner is able to maintain accuracy close to that of the base learner in the face of signal drift. As explained, this is done with no additional new labelled training data. The standard deviations indicated are quite small.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for establishing target localization within an environment comprising:
   executing a first phase of a software model comprising an offline training phase; and
   executing a second phase of the software model comprising an online evaluation and adaptation phase; wherein
   the wireless signals are according to a predetermined standard supporting communications between devices disposed within the environment comprising at least a spatially separated transmitter and receiver; and
   the first phase of the software model comprises processing extracted wireless signals with a training process whilst reference labels of the regions and sub-regions of the environment containing motion and physical movement of a moving subject are auto-generated established based on behavioral statistics of the wireless signals.

2. The method according to claim 1, wherein
the online evaluation and adaptation phase comprises processing unlabeled streaming data measured characteristics of the wireless signals with the configured software model to establish physical location data of another physical object within the environment.

3. The method according to claim 1, wherein the offline training phase comprises:
receiving and analyzing wireless signals and their corresponding location labels whilst a user is present within different location spots of the environment;
statistically formulating correlations between wireless signal readings and the location of the movements and events inside the environment through at least one algorithm of a plurality of algorithms, each algorithm relating to a step selected from the group comprising signal processing, data mining, and feature extraction;
constructing a probabilistic localization model using a base classifier in dependence upon the statistically formulated correlations to generate respective decision boundaries and a confidence score that quantifies how certain the classifier is of its decision.

4. The method according to claim 1, wherein
the online evaluation and adaptation phase comprises:
receiving a live stream of unlabeled wireless signals without any associated location indication arising from the communications between the devices disposed within the environment;
estimating a location label for each segment of wireless signals using a probabilistic model built in an initial offline training phase; and
outputting final location labels to at least one of another system and process, wherein
the probabilistic model also includes a decision-making module that applies at one strategy of a plurality of strategies, each strategy to reduce the variance in the sequence of predicted labels.

5. The method according to claim 1, further comprising
automatically detecting at least one of a structural shift and a drift in the distribution of streaming data comprising:
received live stream of unlabeled wireless signals arising from the communications between the devices disposed within the environment;
applying a change-point-detection technique by continuously computing a divergence score;
identifying the significant changes having a score above a predefined threshold; and
outputting an indicator of drift to at least one of the first phase of the software model, the second phase of the software model, another system and another process.

6. The method according to claim 1, wherein
the first phase of the software model comprises establishing a base classifier for determining a location of a physical object within the environment in dependence upon wireless signals between devices disposed within the environment; and
the second phase of the software model comprises adapting the decision boundaries of the base classifier with a process comprising the steps of:
establishing at least one of a shift and a drift within the wireless signals and generating a drift indicator with the base classifier;
triggering an active query system upon generation of the drift indication;
generating a stream of confidence scores and predicted labels from the base classifier upon generation of the drift indicator;
creating a repository of high-confidence samples of the wireless signals and their corresponding predicated labels in dependence upon the stream of confidence scores and predicted labels from the base classifier upon generation of the drift indicator; and
updating the training data of the base classifier in dependence upon the high-confidence samples of the wireless signals and their corresponding predicated labels stored within the repository.

7. The method according to claim 1, wherein
the environment is an indoor environment; and
the first phase of the software model comprises establishing an initial room-level and sub-room-level localization model by employing a base classifier upon metrics extracted from the wireless signals and corresponding reference labels of the regions and sub-regions of the environment.

8. The method according to claim 1, wherein
the second phase of the software model executes an auto-adaptation method to update decision boundaries of an initial training localization model of regions and sub-regions of the environment.

9. A method for establishing target localization within an environment comprising:
executing a first phase of a software model comprising an offline training phase;
executing a second phase of the software model comprising an online evaluation and adaptation phase; and
executing a stabilization process for the software model comprising at least one of:
executing a plurality of decision-making strategies, each strategy relating to a mathematical technique to establish at least one of a determined location and a confidence score relating to a predicted location label wherein the plurality of decision-making strategies are employed to improve the stability of the software model; and
executing a change-point-detection process to compute a divergence score and employing the divergence score to identify significant changes in metrics extracted from the wireless signals; wherein
the wireless signals are according to a predetermined standard supporting communications between devices disposed within the environment comprising at least a spatially separated transmitter and receiver; and
the second phase of the software model comprises:
processing received metrics extracted from wireless signals between the devices within the environment; and
processing said extracted metrics to provide localization information relating to an object within the environment.

10. A method for establishing target localization within an environment comprising:
executing a first phase of a software model comprising an offline training phase; and executing a second phase of the software model comprising an online evaluation and adaptation phase; and executing an active query system which executes a process comprising:

establishing real time divergence scores relating to metrics extracted from the wireless signals between the devices within the environment which are processed to provide localization information relating to an object within the predetermined indoor region; and establishing a repository of high-confidence examples of the extracted metrics and their corresponding high-confidence location reference for use by the second phase of the software model; wherein the wireless signals are according to a predetermined standard supporting communications between devices disposed within the environment comprising at least a spatially separated transmitter and receiver.

11. A method for establishing target localization within an environment comprising:

executing a first phase of a software model comprising an offline training phase; and executing a second phase of the software model comprising an online evaluation and adaptation phase; wherein the wireless signals are according to a predetermined standard supporting communications between devices disposed within the environment comprising at least a spatially separated transmitter and receiver;

the second phase of the software model executes an auto-adaptation method to update decision boundaries of an initial training localization model of regions and sub-regions of the environment;

the auto-adaptation method employs a base classifier and data stored within a high-confidence repository; and the data stored within the high-confidence repository was established in dependence upon an active query process in execution upon the processor processing generated real-time divergence scores on the extracted metrics of the wireless signals to establish examples of high-confidence wireless metrics and their corresponding high-confidence location reference.

12. A method for establishing target localization within an environment comprising:

executing a first phase of a software model comprising an offline training phase; and executing a second phase of the software model comprising an online evaluation and adaptation phase; wherein the wireless signals are according to a predetermined standard supporting communications between devices disposed within the environment comprising at least a spatially separated transmitter and receiver; and the wireless signals within the first phase of the software model and the second phase of the software model are processed with a data preparation module comprising processes for:

noise removal wherein raw data relating to channel state information (CSI) of the wireless signals is filtered with a set of digital filters where each filter of the set of digital filters filters the raw data over a predetermined frequency range associated with a target moving activity to be detected by the software model;

standardization wherein a fixed score scaling normalization process is applied to standardize the CSI feature spade to a predetermined reference range; and feature extraction comprising:

a first step a sliding window is employed to each stream of CSI samples to extract correlated features that describe a location of an event within the environment; and a second step of extracting or generating new feature spaces from the first step through combining multiple domain information.

13. The method according to claim 12, wherein the standardization process calculates an L2-norm of the CSI vector of each link providing a subset of the wireless signals to rescale the CSI value to the reference range.

14. The method according to claim 12, wherein the new feature spaces are:

temporal amplitude established in dependence upon calculating the moving variance and moving average of CSI amplitudes within each sliding window;

frequency amplitude established in dependence upon calculating statistics within each sliding window comprising at least one of variance, log energy entropy, kurtosis, skewness and standard deviation; and temporal phase established in dependence of phase differences between subcarriers of all pairs of receives and transmitters within the environment tracked over each moving window.

15. A method for establishing target localization within an environment comprising:

executing a first phase of a software model comprising an offline training phase; and executing a second phase of the software model comprising an online evaluation and adaptation phase; wherein the wireless signals are according to a predetermined standard supporting communications between devices disposed within the environment comprising at least a spatially separated transmitter and receiver; and the second phase of the software model incorporates a decision making process employing a classification process wherein a final class decision for a current decision at a point in time the classification process comprises the steps of:

discarding rare class labels that last less than a consecutive samples;

discarding any class label with a confidence score less than $\beta$; and imposing an extra bias towards keeping the current predicted class label until the average confidence score for switching to another class reaches a certain level $\gamma$; and $\alpha$, $\beta$, and $\gamma$ are empirically established by the second phase of the software model over a period of time.

* * * * *